United States Patent [19]
Feng et al.

[11] Patent Number: 5,717,195
[45] Date of Patent: Feb. 10, 1998

[54] IMAGING BASED SLOT DATAFORM READER

[75] Inventors: Chen Feng; Ynjiun P. Wang, both of Fort Myers, Fla.

[73] Assignee: Metanetics Corporation, Fort Myers, Fla.

[21] Appl. No.: 623,544

[22] Filed: Mar. 29, 1996

Related U.S. Application Data

[63] Continuation-in-part of Ser. No. 611,126, Mar. 5, 1996.
[51] Int. Cl.$^6$ ................................................ G06K 07/10
[52] U.S. Cl. ...................................... 235/470; 235/462
[58] Field of Search ...................................... 235/462, 472, 235/454, 469, 470; 382/59, 2

[56] References Cited

U.S. PATENT DOCUMENTS

| | | | |
|---|---|---|---|
| 3,654,435 | 4/1972 | Vaccaro | 235/462 |
| 3,676,644 | 7/1972 | Vaccaro et al. | 235/462 |
| 3,924,105 | 12/1975 | Gassino et al. | 235/462 |
| 4,811,408 | 3/1989 | Goldman | 382/2 |
| 5,034,619 | 7/1991 | Hammond, Jr. | 235/462 |
| 5,340,973 | 8/1994 | Knowles et al. | 235/472 |
| 5,367,151 | 11/1994 | Dvorkis et al. | 235/472 |
| 5,414,251 | 5/1995 | Durbin | 235/472 X |
| 5,420,943 | 5/1995 | Mak | 382/313 |
| 5,486,688 | 1/1996 | Lima et al. | 235/462 |

*Primary Examiner*—Donald T. Hajec
*Assistant Examiner*—Le Thien Minh
*Attorney, Agent, or Firm*—Watts, Hoffman, Fisher & Heinke Co. L.P.A.

[57] ABSTRACT

A fixed position dataform reader reads a dataform printed on a substrate and passed through a desired target area. The reader comprises a housing, a first camera assembly, image processing and decoder circuitry, and a mounting support. The housing has a base surface, a face surface, and at least one side surface interconnecting the base surface to the face surface and defining an interior region. The face surface defines an aperture. The first camera assembly includes a two-dimensional photosensor array supported in the interior region and an optics assembly spaced from the two-dimensional photosensor array to focus an image of the dataform onto the two-dimensional photosensor array. The image processing and decoder circuitry is coupled to the camera assembly for generating decoded data representative of the dataform. The mounting support is secured to the housing for mounting the reader in a fixed position with respect to the desired target area.

13 Claims, 9 Drawing Sheets

IMAGING BASED SLOT DATAFORM READER

CROSS-REFERENCE TO RELATED APPLICATIONS

The present application is a continuation-in-part of co-pending U.S. patent application Ser. No. 08/611,126, filed Mar. 5, 1996, entitled "Portable ID Card Verification Apparatus." U.S. patent application Ser. No. 08/611,126 is herein incorporated in its entirety by reference.

FIELD OF THE INVENTION

The present invention relates generally to the field of image scanning. More particularly, the present invention relates to the field of slot scanners for reading imaged dataforms.

BACKGROUND OF THE INVENTION

For a number of years, retail stores and particularly grocery stores have employed slot scanners at point-of-sale terminals to read UPC bar code labels affixed to items presented for purchase by consumers. The UPC bar code encodes a product identifier for each item. Based on each scanned UPC bar code, the POS terminal retrieves from a remote database a price and product description, for example, for the item identified by the scanned UPC code.

One typical slot scanner comprises a laser for generating a narrow beam of light and a polygon-shaped spinner mirror for sweeping the laser beam in a complex pattern to form a target area. As a UPC label is passed through the target area, the sweeping beam is reflected from the label in accordance with the alternating dark bars and light spaces of the UPC label. A photodetector positioned in the path of reflected illumination outputs signals representative of the widths of the alternating bars and spaces, and decoder circuitry monitors the photodetector and decodes the UPC label.

The typical slot scanner, however, must sweep the laser beam across all of the bars and spaces of the bar code and is therefore limited by the aspect ratio of the bar code to be scanned. The aspect ratio is defined by the ratio of the height of the code to the width of the code. One dimensional (1D) bar codes, such as Code 39 for example, are difficult to read with the typical slot scanner because such codes typically have relatively great widths and therefore relatively low aspect ratios, minimizing the probability that the bar code will be properly read for a given scan.

The typical slot scanner also has difficulty reading two dimensional (2D) dataforms, such as stacked bar codes and matrix codes. A stacked bar code comprises a plurality of horizontal rows of alternating dark bars and white spaces. Vertical synchronization patterns, or row indicator patterns, enable the stacked bar code to be read by the typical slot scanner if the laser beam sweeps fully across each horizontal row of the code. The relatively small aspect ratio of each horizontal row, however, minimizes the probability the beam will sweep across each horizontal row of the stacked bar code for a given scan. Because some matrix codes, such as MaxiCode, DataMatrix and Code 1, do not contain vertical synchronization patterns, the typical slot scanner cannot properly read such codes.

Manufacturers have also used complex spinner mirror and folding mirror arrangements for generating very dense beam sweep patterns to help increase the probability the bar code is properly read. As this mechanical system becomes more complex, however, the typical slot scanner becomes increasingly susceptible to failure.

Hand held charge coupled device (CCD) imaging based readers have been developed which include no moving parts. An imaging assembly includes a camera assembly having a field of view which defines a target area for imaging a dataform. The camera assembly includes a photosensor array and associated charge coupled device for reading out charges accumulated on individual photosensors of the photosensor array over an exposure period and an optic assembly for focusing an image of the target area onto the photosensor array. The imaging assembly generates successive image frames of the target area. A dataform imaged in the target area may be appropriately decoded. A 1D CCD reader has a photosensor array comprising only one row of photosensors which generates a long, narrow field of view or target area. Reading a 1D dataform with a 1D CCD reader requires positioning the code such that all of the bars and spaces are within the field of view.

Furthermore, typical 1D CCD readers have a small working range, that is, a focusing distance range from the front of an optic assembly of the imaging assembly in which a dataform would be properly focused onto the photosensors. The dataform to be read has to be positioned both within the field of view and the working range of the reader imaging assembly to be properly imaged. The narrow field of view and small working range of a 1D CCD reader requires that the operator precisely position the reader with respect to the dataform to achieve a read of the dataform, or, conversely, if the reader is in a fixed position, the operator must precisely position the item with the dataform to be read with respect to the reader imaging assembly. One of the objectives of using a slot scanner is to eliminate the need for operator precision in positioning the dataform to be read with respect to the reader. Therefore, 1D CCD imaging based readers would be inappropriate for use in lieu of a laser based reading assembly for a slot scanner.

Hand held two dimensional (2D) photosensor array dataform readers include a camera assembly having a two dimensional photosensor array and an optic assembly for focusing an image in a field of view or target area of the imaging assembly onto the photosensor array. Existing 2D photosensor array technology has a very small working range making it inappropriate use in lieu of lasers in slot scanners where operator precision cannot be relied on for positioning the code to be within a dataform reading region defined by the field of view and working range.

Another problem associated with 2D photosensor array hand held dataform reader technology which makes it inappropriate for a slot scanner is the small quantity of photosensors or pixels in typical photosensor arrays. Note that a pixel or picture element is the smallest addressable segment, in terms of X and Y segments, on a photosensor array. Each photosensor corresponds to a pixel and the terms "photosensor" and "pixel" are used interchangeably throughout this document.

Traditional sampling theory holds that the smallest dataform element must be imaged onto at least two pixels for proper decoding of the dataform by decoding circuitry in the dataform reader. Typical 2D photosensor arrays comprise a 752 by 582 photosensor or pixel matrix. Therefore, optics must be chosen such that the field of view is appropriately sized such that the image of the dataform on the photosensor array is large enough to include enough pixels for decoding. The limited working range and limited field of view of existing 2D technology makes it inappropriate for slot scanners.

What is needed is a 2D imaging assembly suitable for replacing a laser-based dataform reader of a slot scanner and capable of reading a variety of codes or dataforms, including 2D dataforms such as stacked bar codes and matrix codes. More particularly, what is needed is a 2D imaging based slot scanner which does not suffer from restrictive field of view and working range limitations and is capable of reading both 1D and 2D dataforms.

SUMMARY OF THE INVENTION

A fixed position dataform reader for reading a dataform printed on a substrate and passed through a desired target area is described. The reader comprises a housing, a first camera assembly, image processing and decoder circuitry, and a mounting support. The housing has a base surface, a face surface, and at least one side surface interconnecting the base surface to the face surface and defining an interior region. The face surface defines an aperture. The first camera assembly includes a two-dimensional photosensor array supported in the interior region and an optics assembly spaced from the two-dimensional photosensor array to focus an image of the dataform onto the two-dimensional photosensor array. The image processing and decoder circuitry is coupled to the camera assembly for generating decoded data representative of the dataform. The mounting support is secured to the housing for mounting the reader in a fixed position with respect to the desired target area.

A method of completing a sales transaction for the sale of a plurality of items is also described. Each item includes a dataform including encoded data identifying the item. A dataform reader is mounted at a fixed position. The dataform reader includes a camera assembly, a two-dimensional photosensor array, and an optic assembly for focusing an image of a field of view onto the photosensor array. A dataform is passed through the field of view to capture an image of the dataform and generate image data. The image data is processed and decoded to generate decoded data identifying the item. A price corresponding to the decoded data identifying the item is retrieved. The method may be repeated to retrieve a price for each item.

Additional features of the invention will become apparent and a fuller understanding obtained by reading the following detailed description made in connection with the accompanying drawings.

DETAILED DESCRIPTION

Figure 1:
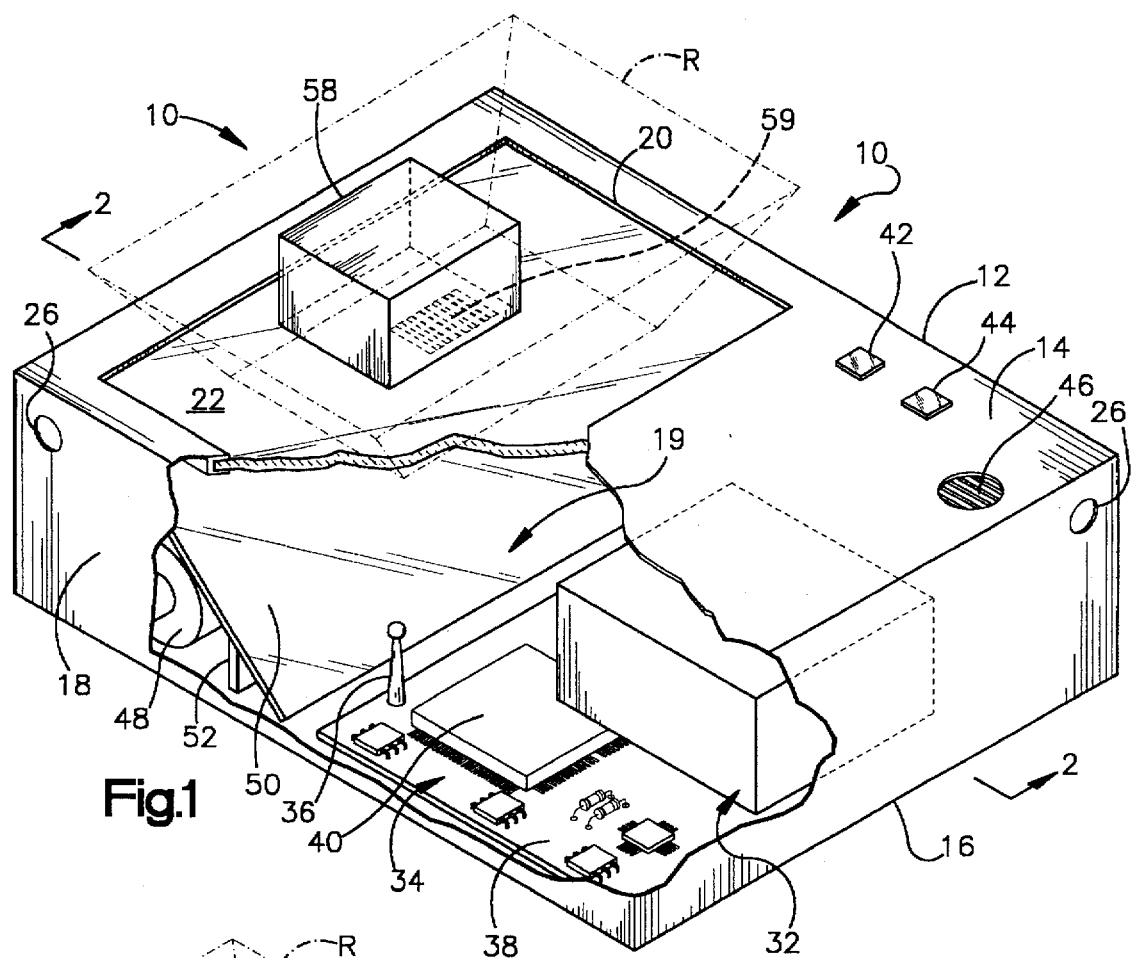
FIG. 1 is a cut-away perspective view of a slot dataform reader apparatus of the present invention.
Figure 2:
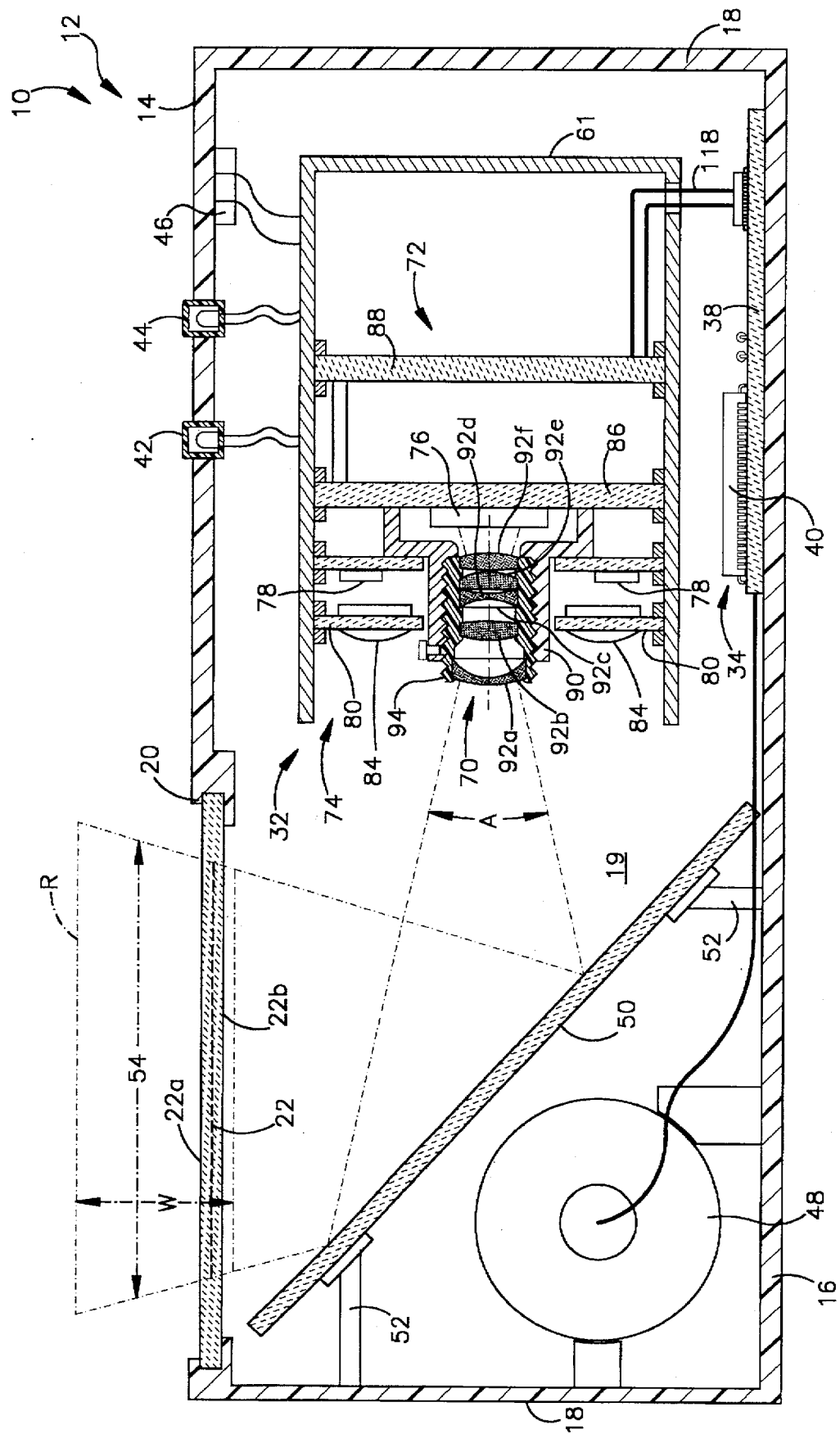
FIG. 2 is a perspective view of a point of sale system incorporating the slot dataform reader apparatus of FIG. 1.

FIGS. 1 and 2 illustrate a slot dataform reader apparatus 10. The slot dataform reader apparatus 10 comprises a housing 12 having an upper or face surface 14, a lower or base surface 16, and four sides 18 to define an interior region 19. A perimeter bezel 20 defines an aperture at the upper surface 14 and supports in the aperture a window 22 of a suitable transparent material, such as glass for example. The sides 18 define internally threaded, mounting bores 26 for mounting the apparatus 10 in a fixed position, such as on a stand or flush with a countertop for example.

The slot dataform reader apparatus 10 comprises an imaging assembly including a camera module 32 and imaging circuitry 34 to capture an image through the window 22 and decode any captured dataform images, such as a bar code or matrix 2D dataform for example, positioned over an upper surface 22a of the window.

Figure 3:
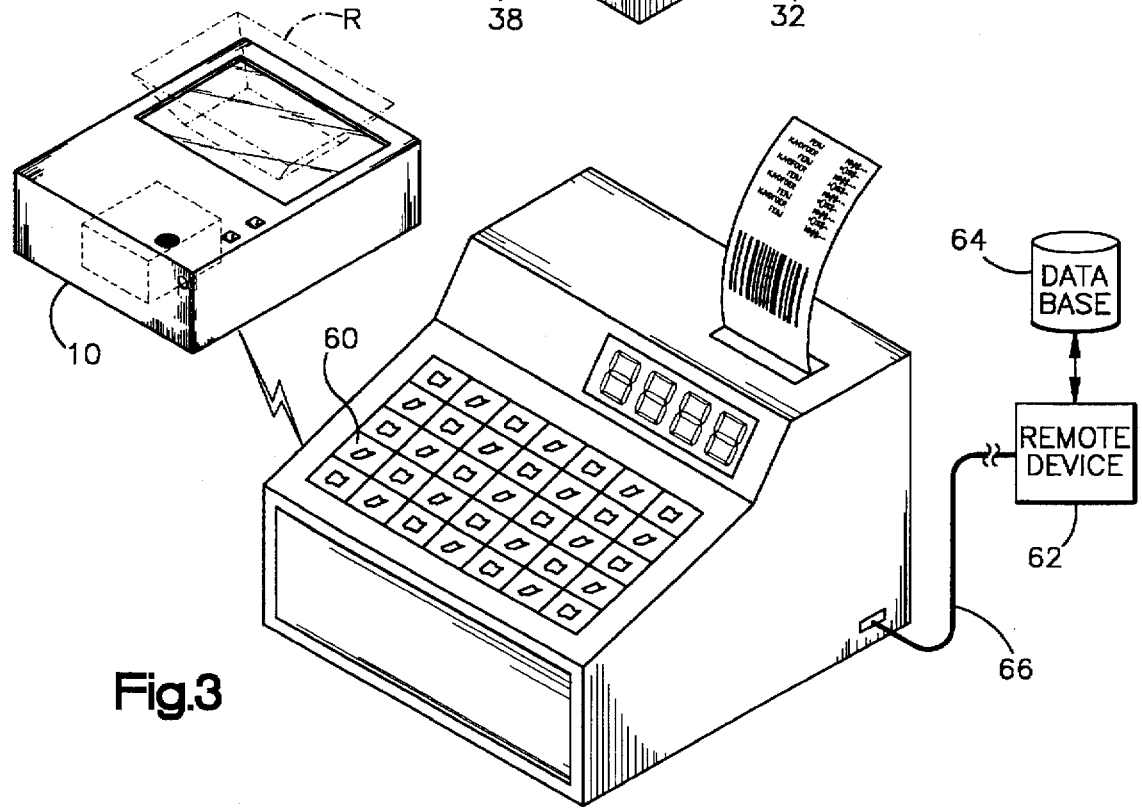
FIG. 3 is a cross-sectional view of the slot dataform reader apparatus of FIG. 1.

The camera module 32 is supported in the interior region 19 and defines a dataform reading region R through the window 22. As illustrated in FIG. 3, the reading region R comprises a target area 54 above the window 22 and a working range W extending through the window 22 to encompass the upper surface 22a of the window 22. The target area 54 is defined by an angular field of view A of the camera module 32. The camera module 32 may read a dataform positioned in the working range W of the reading region R.

A mirror 50 is fixedly positioned in the interior region 19 by supports 52 extending from inner walls of the housing 12. The mirror 50 is positioned to fold the optical path between the camera module 32 and the window 22. Because the mirror 50 allows the camera module 32 to be mounted orthogonally to the window 22, the apparatus 10 is compact.

The imaging circuitry 34 is mounted on a control and decoder board 38 and is electrically coupled to the camera module 32. The imaging circuitry 34 comprises a microprocessor 40 and suitable circuitry, such as memory for storing code executable by the microprocessor 40 for example, for controlling the capture of an image of the target area 54 by the camera module 32 and decoding any captured dataform images to generate decoded dataform data. The imaging circuitry 34 stores a digitized representation of successively captured image frames of the target area 54 generated by the camera module 32 and decodes any captured dataform images that are decodable.

The apparatus 10 also comprises suitable RF circuitry, including a radio transmitter and antenna 36, supported on the control and decoder board 38 for telemetering at least a portion of the decoded dataform data to an external device, such as a point-of-sale terminal for example. The microprocessor 40 may be programmed to control the RF circuitry or to constitute a portion of the RF circuitry.

The apparatus 10 further comprises suitable circuitry supported on the control and decoder board 38 for controlling a red LED 42, a green LED 44, and a speaker 46 to provide an operator with audible and visual feedback in operating the apparatus 10. The apparatus 10 may illuminate the green LED 44 when the apparatus 10 is ready to read a dataform and may illuminate the red LED during decode or data transmission to indicate the apparatus 10 is not ready to read a dataform. The apparatus 10 may activate the speaker 46 to indicate, for example, a successful decode or transmission.

The apparatus 10 comprises a suitable power source 48, such as a battery for example, in the interior region 19. The power source 48 is electrically coupled to the control and decoder board 38 for providing power to the imaging circuitry 34, the camera module 32, and the RF circuitry for example.

The slot dataform reader apparatus 10 may be operated in conjunction with a point-of-sale (POS) terminal 60, for example, at purchase locations in a retail store, as illustrated in FIG. 3. The POS terminal 60 may function as a cash register and generate a customer receipt associated with a purchase of one or more items. The POS terminal 60 is connected to a remote host computer 62 by a wired or wireless local area network (LAN) 66. The host computer 62 accesses a database 64 that stores pricing information for the products sold by the retailer, product descriptions, inventory records, etc. The POS terminal 60 includes receiver circuitry compatible with the RF circuitry in the apparatus 10 for receiving decoded dataform data from the apparatus 10.

In operation, as illustrated in FIG. 1, the operator may pass through the dataform reading region R a dataform 59, such as a bar code label for example, of an item 58 being purchased by a consumer. The dataform 59 includes an encoded product identifier for the item 58. Unlike a hand held reader where the operator must align both the dataform and the field of view of the reader, the operator may simply orient the item 58 to face the dataform 59 toward the upper surface 22a of the window 22 and pass the item 58 through the target area 54. This operation is similar to that the operator would perform using a laser-based slot scanner having a polygon-shaped spinner mirror. The periphery of the target area 54 at a level of the upper surface 22a may be suitably marked on the window 22 to further aid the operator in positioning the dataform 59 over the window 22.

As the camera module 32 images successive frames of the target area 54, the camera module 32 generates a composite analog signal corresponding to each captured frame. Based on these composite analog signals, the imaging circuitry 34 determines whether the camera module 32 captured a decodeable representation of the dataform 59 in an imaged frame of the target area 54 as the item 58 passed through the target area 54. If so, the imaging circuitry 34 decodes the dataform 59 to generate decoded dataform data. The RF circuitry telemeters at least a portion of the decoded dataform data, such as the decoded product identifier for the item 58 for example, to the POS terminal 60.

The POS terminal 60 relays the transmitted decoded data via the LAN 66 to the remote host computer 62. The remote host computer 62 accesses the data base 64 and retrieves, for example, a product name, sales price, and any other suitable information associated with the item 58 as identified by the decoded dataform. The host computer 62 then transfers the accessed information to the POS terminal 60 for use in completing the sales transaction. The POS terminal 60 may print the product name and price on a sales receipt, for example. The apparatus 10 may also be used to capture an image of a credit or debit card, for example, by passing a dataform of the card through the target area 54. The POS terminal 60 may then transmit to a host computer decoded dataform data for the card with a total purchase amount, for example, to secure payment for the item or items.

As illustrated in FIG. 2, the camera module 32 for the apparatus 10 comprises a camera assembly 72, an optics assembly 70, and an illumination assembly 74 supported by a housing 61 for the camera module 32. The camera module 32 images frames of the target area 54 by illuminating the target area 54 by the illumination assembly 74 and capturing reflected illumination from the target area 54 by the camera assembly 72. The optics assembly 70 helps focus or direct the reflected illumination for the camera assembly 72. A lower surface 22b of the window 22 may have an anti-reflective coating to reduce reflectance in the interior region 19 off the lower surface 22b.

The illumination assembly 74 comprises a plurality of surface mount light emitting diodes (LED's) 78 supported on a printed circuit board 82. For one embodiment, the printed circuit board 82 includes sixteen LEDs 78 arranged into four banks having four LEDs each. One suitable surface mount LED 78 is available as Part No. MTSM735K-UR or MTSM745KA-UR from the MarkTech Corporation of Latham, N.Y.

The illumination assembly 74 directs the illumination from each of the LED's 78 through optical surfaces 84 of a spaced-apart lens array 80. The lens array 80 includes a horizontally-aligned cylindrical optic exit surface positioned in front of each LED bank and a vertically-aligned cylindrical optic entry surface positioned in front of each LED 78. The entry and exit surfaces optically interact to generate an illumination intensity distribution pattern which substantially coincides with the field of view A of the camera module 32. The lens array 80 may be fabricated from acrylic or polycarbonate, for example.

One suitable illumination assembly 74 is described in U.S. patent application Ser. No. 08/606,619, filed Feb. 26, 1996, entitled "Portable Data Collection Device with LED Targeting and Illumination Assembly." U.S. patent application Ser. No. 08/606,619, (Attorney Docket No. 14-007) is herein incorporated in its entirety by reference.

The camera assembly 72 comprises a two-dimensional (2D) photosensor array 76 mounted to a surface of a printed circuit board 86. For one embodiment, the photosensor array 76 comprises an interlaced 752×582 matrix array of photosensors with Phase Alternation Line (PAL) compatible interlaced read-out circuitry. The photosensors for the photosensor array 76 are also referred to as photodiodes or pixels.

The optics assembly 70 is positioned in the optical path between the target area 54 and the photosensor array 76 to focus an image of the target area 54 onto the photosensor array 76 as indicated by the focusing lines extending through the optics assembly 70 to the photosensor array 76.

The optics assembly 70 includes a lens assembly comprising a plurality of lenses $92a$, $92b$, $92d$, $92e$ and $92f$ supported in a housing 94. A thin metal disk $92c$ with a small central opening is positioned between the lenses $92b$ and $92d$. One suitable optics assembly 70 is available from Marshall Electronics, Inc. of Culver City, Calif. and is described in U.S. patent application Ser. No. 08/606,619, filed Feb. 26, 1996; entitled "Portable Data Collection Device with LED Targeting and Illumination Assembly" and referenced above.

The optics assembly 70 is secured at a predetermined, spaced position with respect to the photosensor array 76 by a support shroud 90. The support shroud also serves to shroud or block non-focused illumination from the photosensor array 76. The support shroud 90 includes an internally threaded bore for receiving the threaded housing 94 for the optical assembly 70.

Figure 4:
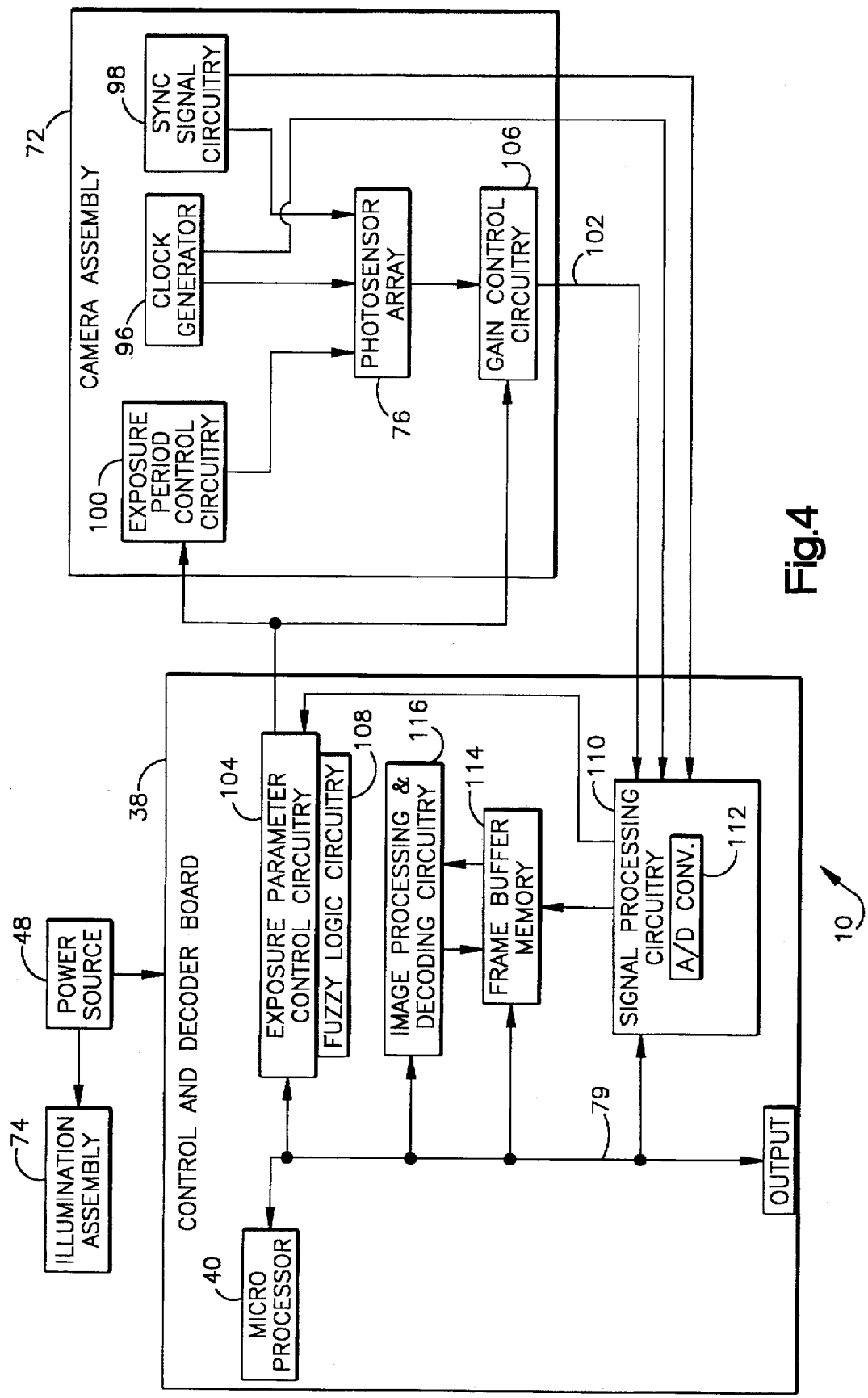
FIG. 4 is a block diagram of selected circuitry of the slot dataform reader apparatus of FIG. 1.

The camera assembly 72 comprises a printed circuit board 88 to support circuitry, such as a clock generator 96, synchronization signal generator circuitry 98, exposure period control circuitry 100, and gain control circuitry 106 as illustrated in FIG. 4. This circuitry is electrically coupled to the photosensor array 76 for generating a PAL compatible composite video signal 102 corresponding to an image captured by the photosensor array 76.

To capture an image of the target area 54, the photosensors of the photosensor array 76 are charged by illumination incident on the photosensors during an exposure period. The intensity of light incident on individual photosensors varies somewhat uniformly from very bright for whiter areas of the image to very dark for darker areas of the image. The magnitude of the charge for a given photosensor at the end of the exposure period is dependent on the intensity of the illumination incident on the photosensor during the exposure period.

The camera assembly 72 at the end of the exposure period reads the magnitude of the charge accumulated on each photosensor for the exposure period. The clock generator 96 is coupled to a crystal oscillator and generates asynchronous clocking signals to read the charge magnitudes of the photosensors. The charges on the photosensors are read out through charged coupled device (CCD) elements adjacent the photosensors. For a photosensor array 76 having two interlaced fields, one CCD element is provided for reading the charge magnitude for two photosensors, enabling two reads of the photosensor array 76 to capture one full image frame. For one embodiment, the photosensor array 76 comprises a two interlaced field 752×582 matrix array of photosensors for a total of 437,664 pixels for a full image frame.

The camera assembly 72 generates the composite analog video signal 102 corresponding to consecutive fields of the image incident on the photosensor array 76. The composite analog video signal 102 comprises a series of imaging signals, each of which has a magnitude corresponding to the illumination intensity incident on a photosensor during an exposure period. The camera assembly 72 generates the composite analog video signal 102 with synchronization signals generated by the synchronization signal generator circuitry 98 and interspersed among imaging signals for a given row of photosensors of the photosensor array 76.

The imaging circuitry 34 comprises exposure parameter control circuitry 104 and fuzzy logic control circuitry 108 which operates in conjunction with the exposure period control circuitry 100 and the gain control circuitry 106 for controlling the duration of the exposure period and the amplification of the composite video signal 102. The imaging circuitry 34 also comprises signal processing circuitry 110, a frame buffer memory 114, and image processing and decoding circuitry 116. The microprocessor 40 may be programmed to constitute at least a portion of the other circuitry for the imaging circuitry 34, such as the exposure parameter control circuitry 104 and the image processing and decoding circuitry 116 for example.

The camera assembly 72 is electrically coupled to the imaging circuitry 34 via a lead 118, as illustrated in FIG. 2, to conduct the composite video signal 102 to the imaging circuitry 34. Under the control of the microprocessor 40, the imaging circuitry 34 receives the composite video signal 102 by the signal processing circuitry 102 with clocking and synchronization signals generated by the clock generator 96 and the synchronization signal circuitry 98, respectively. The signal processing circuitry 110 digitizes the analog video signal 102 with an analog-to-digital (A/D) converter 112 and converts the digitized video signal to a sequence of gray scale values, each representative of the magnitude of illumination incident on a photosensor during an exposure period. The signal processing circuitry 110 stores a set of gray scale values representing a captured image frame of the target area 54 in the frame buffer memory 114.

The image processing and decoding circuitry 116 determines whether a decodeable dataform image is represented in the captured image frame in the frame buffer memory 114 and if so decodes the dataform to generate decoded dataform data for output to the RF circuitry.

Suitable circuitry for the camera assembly 72 and the imaging circuitry 34 is also described in U.S. patent application Ser. No. 08/560,063, filed Dec. 20, 1995 and entitled "Portable Data Collection Device with Two Dimensional Imaging Assembly." U.S. patent application Ser. No. 08/560,063 is assigned to the assignee of the present invention and is herein incorporated in its entirety by reference.

To further improve the ability of the slot reader 10 to read dense dataforms, the imaging processing and decoding circuitry 116 includes sub-pixel processing capabilities which are useful for reading a bar code dataform wherein the smallest element (bar or space) of the dataform images onto fewer than two pixels. For example, referring to FIG. 6, bar 115 of a dataform portion 103 is imaged onto only pixel position, 11. A more detailed description of sub-pixel image processing and decoding by microprocessor 40 is discussed with reference to FIGS. 6-12.

Figure 6:
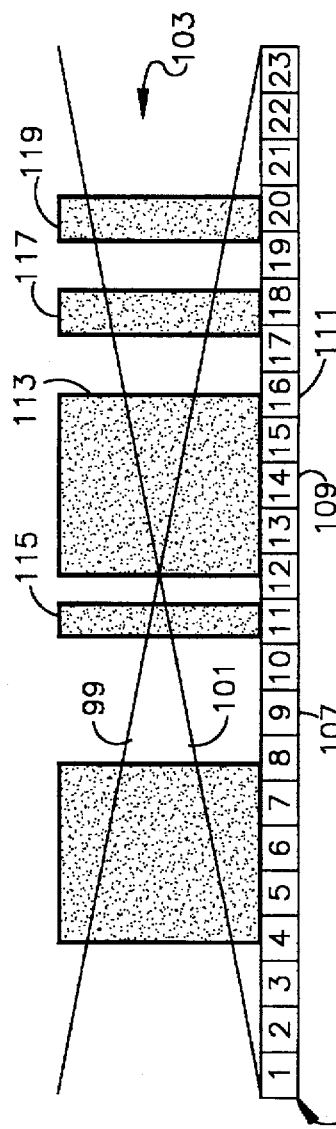
FIG. 6 is schematic diagram showing a representative portion of a bar code dataform and corresponding pixel positions from a portion of one row of a photosensor array.

A representative portion of a row 103 of a bar code dataform is shown in FIG. 6. The image of the row portion 103 is processed by analyzing one or more of sampling lines such as shown in 99 and 101 that extend at oblique angles through the row portion 103 of the dataform wherein each of the sampling lines 99 and 101 is represented by a sequence of gray scale values stored for each of the pixels in an image frame along the line.

For purposes of illustration, FIG. 6 shows a simple sequence of the row comprising bars and spaces of the bar code dataform and an adjacent representation of a line of pixel positions 105, or alternatively, charge coupled device (CCD) sensor element positions through which the sample line 101 extends. It will thus be appreciated that a pixel position 9, labeled 107, receives illumination reflected from a high reflectance white region of the bar code dataform row portion 103, while a pixel position 14, labeled 109, receives illumination reflected form a low reflectance bar or black region. A pixel position 16, labeled 111, receives an intermediate level of illumination from a region including portion of a bar and a portion of a space, that is, a black/white region representing an edge transition 113. When digitized and stored in the frame buffer memory 114 as gray scale values, the pixel position 9 is represented by a high gray scale value (near 255), the pixel position 14 is represented as a low gray scale value and the pixel position 16 is represented as an intermediate gray scale value (around 122 or about half way between zero and 255).

Figure 7:
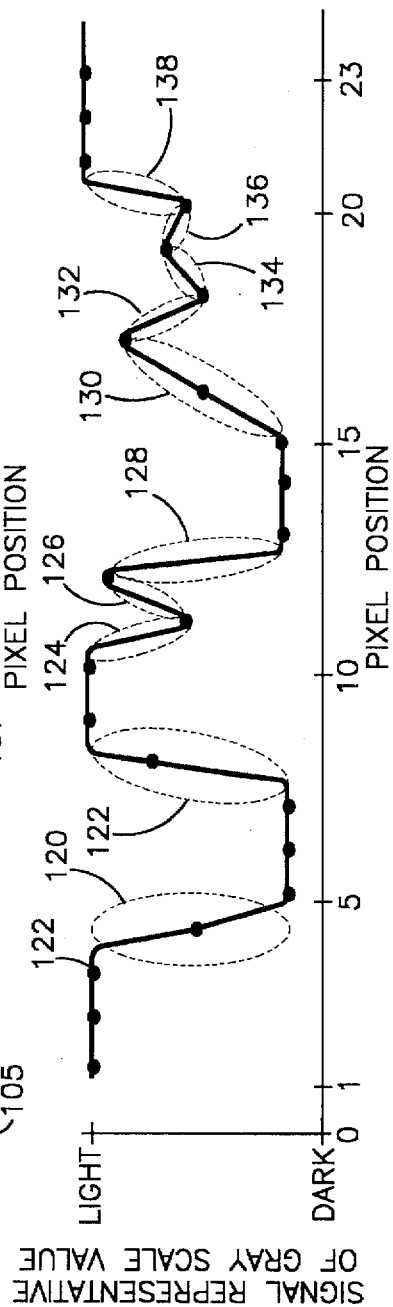
FIG. 7 is a representative graph of pixel positions for a portion of one row of the photosensor array versus a signal representative of gray scale value.

FIG. 7 shows an ideal gray scale plot of an output signal representative of gray scale value for each pixel position of the dataform row portion 103 of FIG. 6 without noise, that is without ambient illumination from sources other than light reflected from the dataform striking the photosensor array 76 and without noise variations in the array. The pixel position output signal voltage magnitudes are proportional to the pixel gray scale values and those terms will be used interchangeably throughout this discussion. The FIG. 7 plot requires sub-pixel processing because, as shown, the smallest bars 115, 117 and 119 are narrower than two pixels in width. In FIG. 6, each edge transition represents a transition from black to white (bar to space) or white to black (space to bar).

In FIG. 7, each edge transition is represented by a transition segment (illustrated as a line segment) transitioning from a higher gray scale value (white) to a lower gray scale value (black), for example, the circled line segment labeled 120, or a transition segment transitioning from a lower gray scale value to a higher gray scale value, for example, the circled line segment 122. In addition to transitions from black to white and white to black, there are included transition segments between higher and lower intermediate gray scale values (e.g., gray to gray), for example, the circled lines segments labeled 126, 132, 134 and 136. Finally, there are transition segments between intermediate gray scale values and higher gray scale values (white), for example, the circled line segments 124 and 138.

Each transition segment 120, 122, 124, 126, 128, 130, 132, 134, 136, 138 can be considered as extending between a local maximum and local minimum. Use of the term "local" is due to the fact that the maximum or the minimum for a given transition segment may represent an intermediate gray scale value less than the highest gray scale value corresponding to white or greater than the lowest gray scale value corresponding to black. The local maximum and local minimum represents adjacent peak and trough gray scale values and can be in a peak to trough sequence, or vice versa. In FIG. 7, in the absence of noise, each of the 10 transition segments 120, 122, 124, 126, 128, 130, 132, 136, 138 represents a valid edge transition. As illustrated, each high reflectance space plots as a peak and each low reflectance bar plots as a trough.

Certain characteristics of the gray scale peaks and troughs (maximum and minimum gray scale values) are particularly significant as follows. If a space is large enough to cover several pixel positions, the peak is wide and flattens at the white gray scale value. Similarly, a wide bar is represented by a wide flat-bottomed trough at the black gray scale value. If a space is narrower than two pixels wide, then the peak will be narrower than two pixels. More specifically, for narrower spaces the height of the peak may only reach an intermediate gray scale value rather than a white value, as noted, and for narrower spaces, the width of the trough will be narrower than two pixels and may only reach an intermediate gray scale value rather than a black value.

Figure 8:
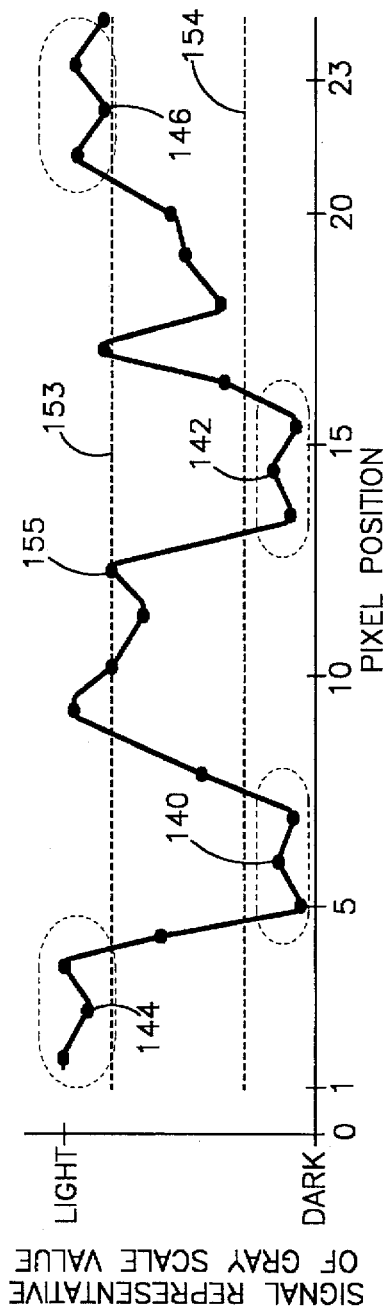
FIG. 8 is a representative graph of pixel positions for a portion of one row of the photosensor array versus a signal representative of gray scale value as shown in FIG. 7 with noise introduced.

In FIG. 8, random noise has been introduced to the FIG. 7 plot producing a gray scale plot including nineteen transition segments. Since FIG. 7 includes only ten transitions segments 120, 122, 124, 126, 128, 130, 132, 134, 136, 138, the FIG. 8 transition segments in excess of that number are "false" transition segments. However, the following additional characteristics can be recognized. First, if a peak (or trough) is more than two pixels wide, there are pixel positions along the top of the peak (or bottom of the trough) whose gray scale value can be changed by noise to result in introduction of false peaks or troughs, or both. In FIG. 8, noise has resulted in false peaks labeled 140, 142 at pixel positions 6 and 14. Second, if a peak (or trough) is two pixels or less in width, noise can distort the maximum (or minimum) gray scale value but cannot add a new peak or trough. Also, if there are a series of bars and spaces each one two pixels wide, each bar and space will plot as a single peak or trough, regardless of the presence of noise or the magnitude of such noise.

Thus, false transition segments produced by noise can only be present within high and low ranges of gray scale values. Accordingly, a noise margin is employed so that small transition segments present in such high and low gray scale ranges are treated as not representing actual edge transitions. The noise margin is not applied to small transition segments where a peak or trough is present in the intermediate gray scale region (i.e., between the high and low ranges). Since noise cannot create false transition segments outside of the high and low gray scale ranges, each transition segment in the intermediate gray scale region is considered an information bearing transition representing an edge transition. High and low gray scale ranges for this purpose may be designated on a predetermined or trial and error basis for use with codes of a particular type (e.g., having known characteristics). The ranges may be actively determined by histogram analysis. In FIG. 8 the high range may also be considered as extending from pure white to the gray scale value represented by line 153, with the low range from black to the line 154 gray scale value. With these ranges, a noise margin is effective to cause the transition segments emanating from the noise-modified gray scale values 140 and 142 (as respective false local maximum values) to be treated as false segments, without restricting transition segment 155 from being processed as representing an actual edge transition.

Figure 9:
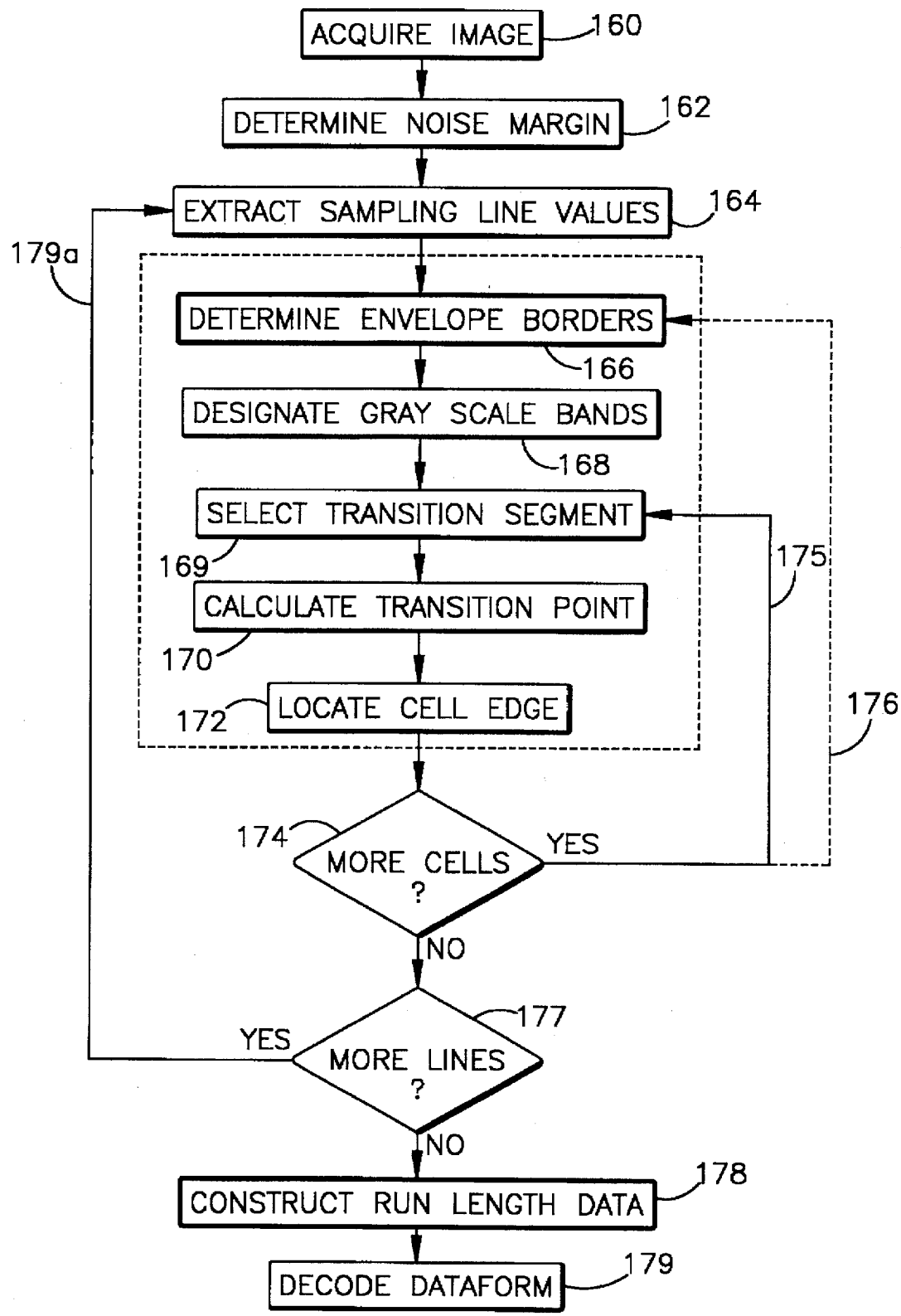
FIG. 9 is a block diagram of a sub-pixel imaging process for the slot dataform reader apparatus of FIG. 1.
Figure 10:
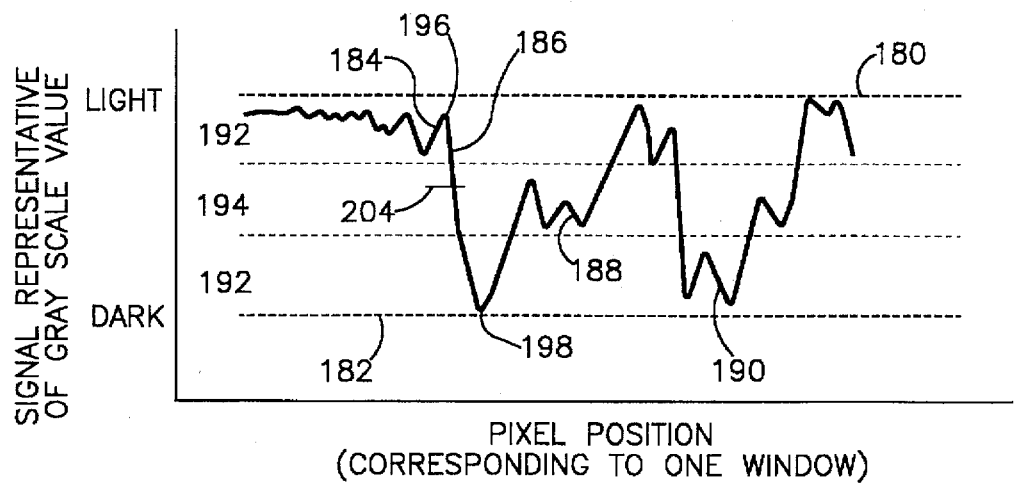
FIG. 10 is a representative graph of pixel positions for one imaging window of the photosensor array versus a signal representative of gray scale value.

FIG. 9 is a flow chart that depicts a dataform code edge transition location method for sub-pixel processing of an image of the field of view of the camera module 72. First, a frame image including the dataform is stored by the microprocessor 40 at block 160 and the noise margin is determined at block 162. A sampling line of gray scale values is then extracted from the stored image data at block 164 by the microprocessor 40. At block 168, the upper and lower envelope borders are estimated by the microprocessor 40 and updated for the sequence of gray scale values for the sampling line just extracted. FIG. 10 represents a portion of the gray scale value sequence on a horizontally expanded scale. In this example, the portion is one of a series of window portions comprising the full sequence. As shown, the upper and lower envelop borders are indicated at 180 and 182. Preferably, a window portion is selected to include gray scale vales for a limited number of bars and/or spaces of the dataform code. In this manner, the sampling line will comprise a series of window portions with envelope borders determined individually for each window portion. As a result the envelope borders are dynamically determined for successive windows, providing high resolution.

It is noted that a change in the level of reflected illumination representing a black and white, or white and black, edge will result in a change in gray scale values along a sampling line. FIG. 10 shows a sequence of gray scale values connected by transition segments, representative examples of which are identified at 184, 186, 188 and 190. As already discussed, it has been found that in the presence of noise, small transition segments may represent either actual edge transitions or false edge transitions, that is, spurious gray level variations attributable to noise effects. Thus, transition segment 186 is large enough not to be attributable to noise. However, transition segments such as those shown in 184, 188 and 190 have a small magnitude comparable to the magnitude of spurious effects attributable to noise. High resolution decoding can be achieved by utilizing a noise margin as discussed above to characterize small transition segments occurring at relatively high or low gray scale values as attributable to noise. The noise margin is, however, selectively utilized so that while transition segments such as 184 and 190 are treated as false, transition segments such as 186 and 188 are treated as valid and processed in order to locate edge transitions.

More particularly, for the individual window portion of FIG. 10, at block 166 of FIG. 9, the microprocessor 40 divides the gray scale range between the upper and lower envelop borders into three horizontal bands. For example, a ratio of 2 to 1 may be used with each of the outer bands 192 twice as wide as the central band 194. With this ratio the width of bands 192 will each be 40 percent and band 194 will be 20 percent of the overall width between the upper and lower envelope borders 180 and 182. As a result, as the width (i.e., range of gray scale values) between the envelope borders change for different window portions of a sampling line, the widths of the bands 192 and 194 will be dynamically adjusted for each window section during sub-pixel processing. Thus at block 168 transition segments such as 184 and 190 which fall within the upper and lower bands 192 are subject to the noise margin and are discarded by the microprocessor 40 as spurious effects if the transition segment magnitude falls below the noise margin. Transition segments such as 186 which have a magnitude greater than the noise margin are treated by the microprocessor 40 as representative of actual edge transitions, as are segments such as 188 that are contained within the central band 194. Thus, transition segments falling within one of the outer bands 192 are treated as spurious if they fall below the noise margin, but transition segments falling within central band 194 are processed, regardless of magnitude.

At block 169, a first transition segment extending between two successive gray scale values is selected by the microprocessor 40, subject to the block 168 noise margin as implemented in the context of outer bands 192, as discussed above. Thus, the transition segment 186 may be selected by the microprocessor 40 for purposes of block 169. As shown, the transition segment 186 extends between gray scale end point values 196 and 198, that may respectively be referred to as local maximum and local minimum values.

Figure 11:
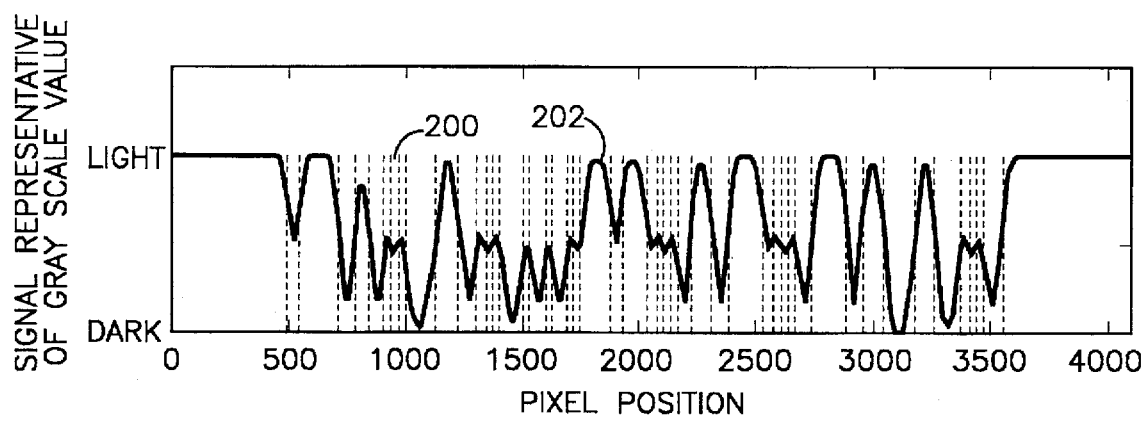
FIG. 11 is a representative graph of a sample of selected pixel positions versus a signal representative of gray scale value.

At block 170, the adaptive transition point is determined along transition segment 186 as a function to its end point gray scale maximum and minimum values labeled 196 and 198. The adaptive transition point represents the location of the relevant edge transition relative to the inclined length of the transition segment. In accordance with the invention, during sub-pixel processing an adaptive transition point is calculated for each transition segment selected as representative of an edge transition. In a currently preferred embodiment, the adaptive transition point for each edge transition is calculated based upon a Gaussian convolution model. The gray scale pixel values along a sampling line can be modeled as the samples of an input signal with step edges passing a linear system with a Gaussian impulse response. In FIG. 11, an example of the input and output of a particular sampling line is illustrated, with the Gaussian convolution kernel width (typically designated σ) set at 1.1. pixels and the bar code module width (minimum bar width) set at 1.5 pixels. The input signal 200 (dashed lines) results in the output 202 (solid line) upon application of the Gaussian convolution model utilizing known techniques. Application of the Gaussian convolution model may also use integrated or point sampling techniques to obtain the output in a form similar to that shown in FIG. 11. The Gaussian convolution model accounts for convolution of the optic assembly 70 and photosensor array 76, with the model assimilating these components into processing of the gray scale pixel values along the sampling line. For a transition segment representing a valid edge transition, the adaptive transition point in a preferred embodiment may be calculated using the following relationship that fits the Gaussian model:

$$a=8+10*[(MAX+MIN)-(U+L)]/(U-L)$$

$$T=a*MIN+(16-a)*MAX$$

Where MAX is the local maximum value, MIN is the local minimum value, U is the upper envelope border value, L is the lower envelope border value, and T is the transition point.

With reference to FIG. 10 the local maximum and minimum values for transition segment 186 are indicated at 196 and 198 with the adaptive transition point shown at 204. For a range of convolution kernel widths and bar code module widths of interest, this transition point can be fit into a linear function of the local maximum 196 and local minimum 198 for a single edge, and the minimum and maximum of the output of the dataform elements having the greatest width. In general, the separation width between a pair of rising and falling transition segments representing edges in wider bar code patterns is much larger than the convolution kernel width. The minimum and maximum of the response relative to wide bar code patterns are thus the upper and lower envelope borders of the signal waveform of the sequence of gray scale values.

The Gaussian convolution model uses the middle point between the relevant upper and lower envelope borders of the signal envelope and the maximum/minimum gray scale values (196 and 198 for transition segment 186) as input parameters. As noted in FIG. 11, the transition point as determined for transition segment 186 is represented at point 204 along the segment between points 196 and 198. As thus determined, threshold 204 will typically not be at the midpoint between points 196 and 198. In this manner, dynamic transition point determination is provided by calculating a transition point for each transition segment selected as representing an edge transition.

Figure 12:
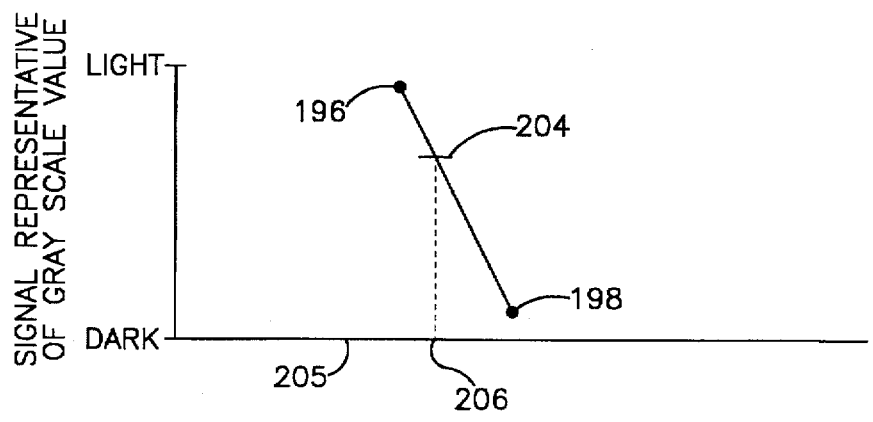
FIG. 12 is a representative graph of two selected pixel positions of FIG. 10 versus a signal representative of gray scale value.

After determination of the adaptive transition point for transition segment 186, at block 172 the relevant edge is located by the microprocessor 40. A linear interpolation is used as illustrated in FIG. 12. Thus, the first edge transition in this example is located along the sampling line (represented by line 205 in FIG. 12) at position 206 corresponding to the point of intersection of the vertical projection of transition point 204 with line 205. As discussed, 196 and 198 represent a sampling line across the bar code dataform image. Point 206 thus indicates that location of the first edge transition processed in this example.

At block 174, the determination is then made by the microprocessor 40 as to whether there are additional edge transitions to be located along the first sampling line. If so, steps 169 and 172 are repeated (by activation via path 175) for each remaining edge transition to be located along this sampling line. If additional edge transitions remain to be located, it will be apparent from the description above that the next such edge transition may be represented by a transition segment between gray scale values which lie along the sampling line at pixel positions beyond the particular window section represented in FIG. 10. If so, in going to the next window section, action will be implemented, via path 176, to newly determine envelope borders and designate gray scale bands for purposes of noise margin implementation at blocks 177, 178 and 179, as described below. It will be understood that in some applications it may be adequate to determine envelope borders once for a complete sampling line, without implementation of a series of window sections.

At block 177, the microprocessor 40 determines whether edge transitions are to be located with reference to a second sampling line across the bar code dataform image. If so, blocks 164 through 170 are repeated (by activation via path 179a) for each remaining sampling line.

At block 178 run length data is constructed to represent edge transition of the bar code. Run length data may be in the form of a series of numerical values representing the widths of the elements. At block 179 the run length data is utilized to decode the dataform using standard decoder software for the chosen bar code dataform format.

Figure 5:
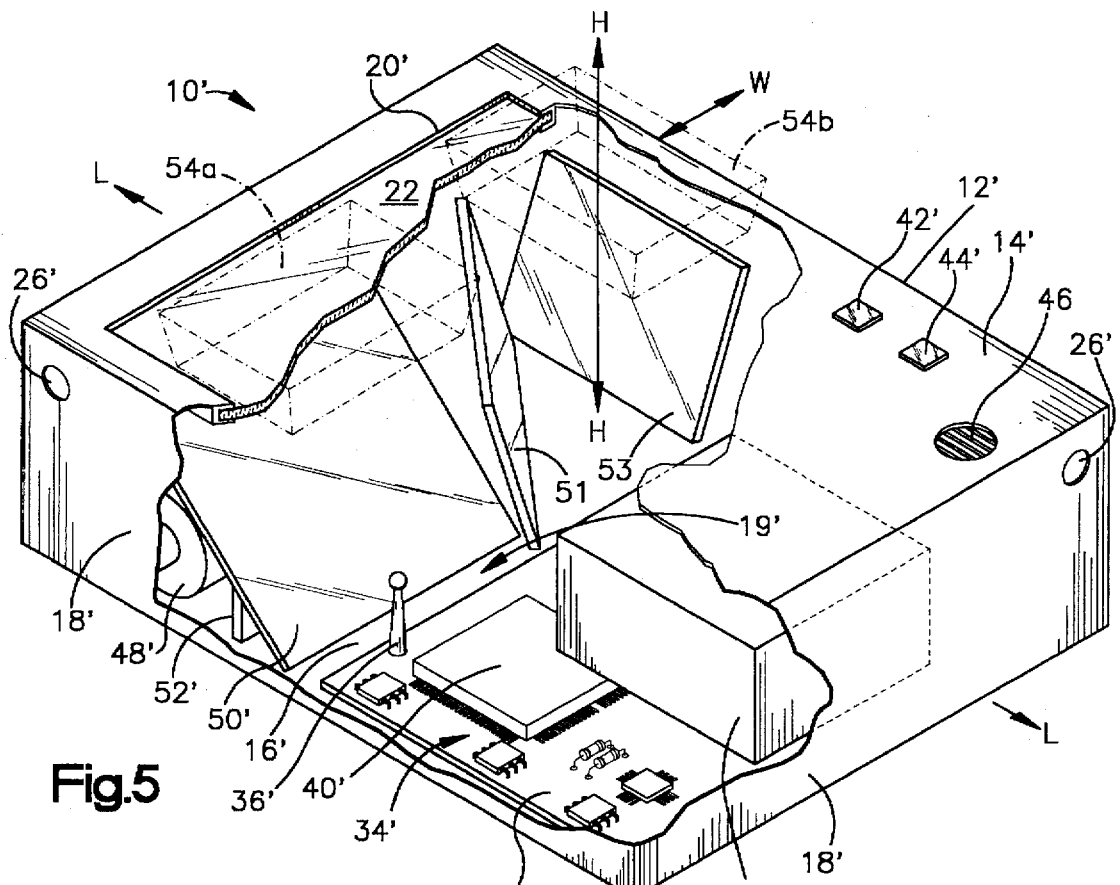
FIG. 5 is a cut-away perspective view of an alternate embodiment of a slot dataform reader apparatus of the present invention.
Figure 5A:
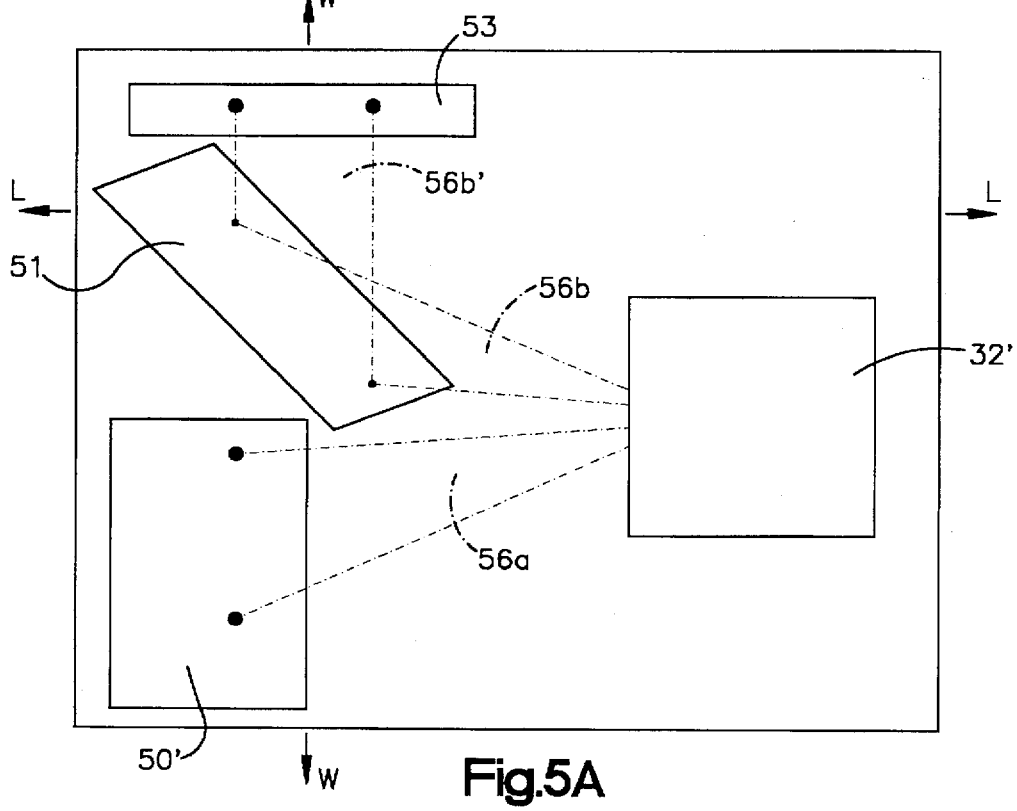
FIG. 5A is a top plan view of the slot dataform reader apparatus of FIG. 5 with a top portion removed.

FIGS. 5 and 5A illustrate a slot dataform reader apparatus 10' for another embodiment. The slot dataform reader apparatus 10' is similarly constructed as the slot dataform reader apparatus 10 illustrated in FIG. 1. The slot dataform reader apparatus 10', however, comprises a first mirror 50', a second mirror 51, and a third mirror 53 positioned to fold the optical path between the camera module 32' and the window 22'.

The first mirror 50' is fixedly positioned in the interior region 19 by supports 52' extending from inner walls of the housing 12'. The first mirror 50' is positioned at an approximately 45 degree angle with respect to the camera module 32 such that the first mirror 50' redirects the field of view of the camera module 32' from a direction indicated by L to a direction indicated by H. The first mirror 50' redirects a first field of view portion 56a to define a first target area portion 54a for the apparatus 10'. The second mirror 51 is positioned to redirect a second field of view portion 56b towards the third mirror 53. The third mirror 53 is positioned to redirect the redirected second field of view portion 56b' to help define a second target area portion 54b. The mirrors 50', 51, and/or 53 may be positioned to optimize the locations of the first target area portion 54a and the second target area portion 54b. The mirrors 50', 51, and/or 53 may also be positioned to define the first and second target area portions 54a, 54b to overlap one another.

A plane exists within the field of view of the camera module 32' at which an object will be more sharply focused onto the photosensor array 76'. The optical paths for the first field of view portion 56a and for the second field of view portion 56b may be different such that the best focus plane for the first target area portion 54a may not be coplanar with the best focus plane in the second target area portion 54b. These best focus planes may be angled and offset from each other. For the illustrated apparatus 10', the mirror 51 is positioned at an approximately 45° angle with respect to the L direction to redirect the second field of view portion 56b along a direction indicated by W and is positioned to add a relatively small component in the H direction to the redirected field of view portion 56b'. The mirror 53 is positioned to redirect the field of view portion 56b' in the H direction.

Figure 13:
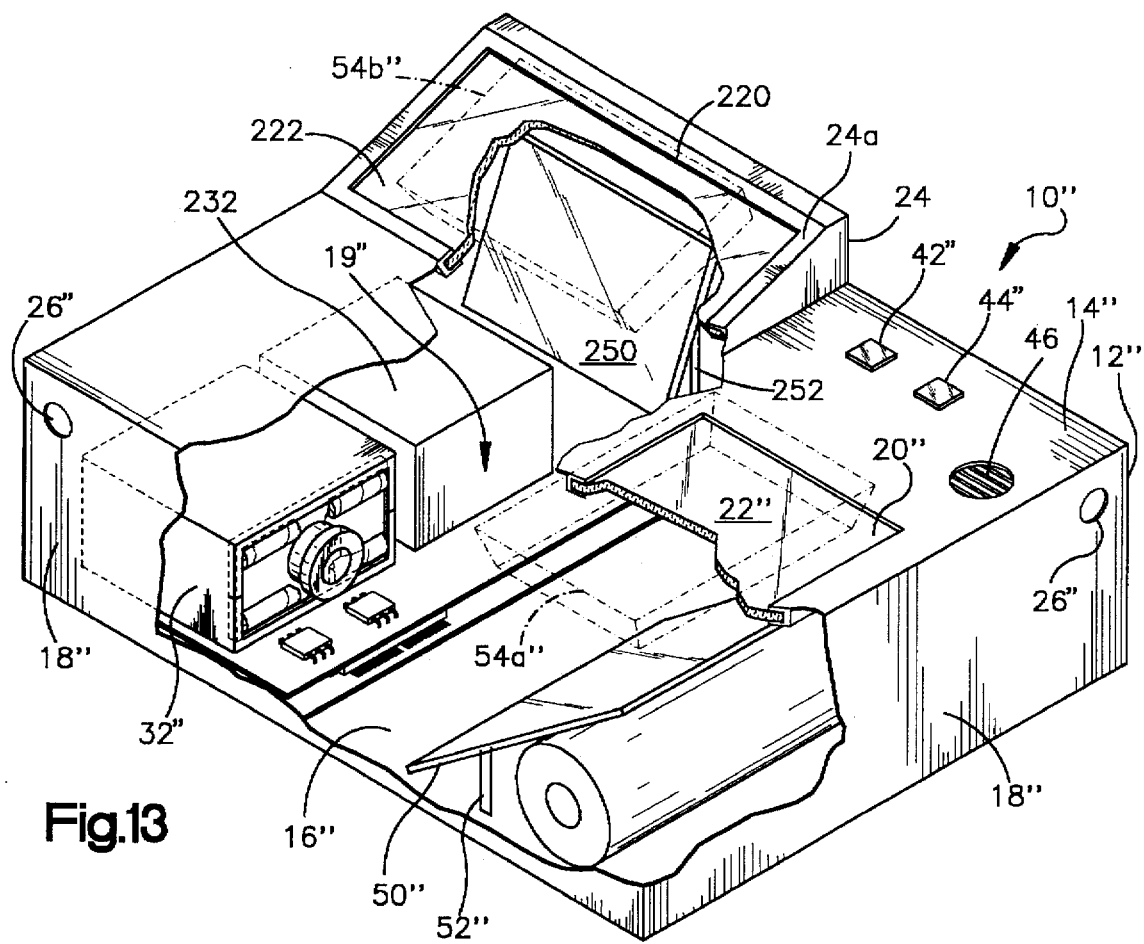
FIG. 13 is a cut-away perspective view of yet another embodiment of a slot dataform reader apparatus of the present invention.

FIG. 13 illustrates a slot dataform reader apparatus 10" for another embodiment. The slot dataform reader apparatus 10" is similarly constructed as the slot dataform reader apparatus 10 of FIG. 1. The upper surface 14" for the slot dataform reader apparatus 10", however, comprises a raised portion 24 with an upper surface 24a. The upper surface 24a may be tipped with respect to the upper surface 14". A perimeter bezel 220 defines an aperture at the upper surface 24a and supports in the raised aperture a window 222 of a suitable transparent material, such as glass for example.

The first camera module 32" is supported in the interior region 19" and defines a first target region portion 54a" above the first window 22". The first mirror 50" is similarly positioned as for the embodiments of FIGS. 1 and 5 to fold the optical path between the first camera module 32" and the first window 22".

The slot dataform reader apparatus 10" also comprises a second camera module 232 supported in the interior region 19". The second camera module 232 is similarly constructed as the first camera module 32" and defines a second target region portion 54b". A second mirror 250 is fixedly positioned in the interior region 19" by supports 252. The second mirror 250 is positioned to fold the optical path between the second camera module 232 and the second window 222. The first and second mirrors 50" and 250 may be positioned to angle or offset the first and second target area portions 54a" and 54b" with respect to one another in a suitable manner.

Figure 14:
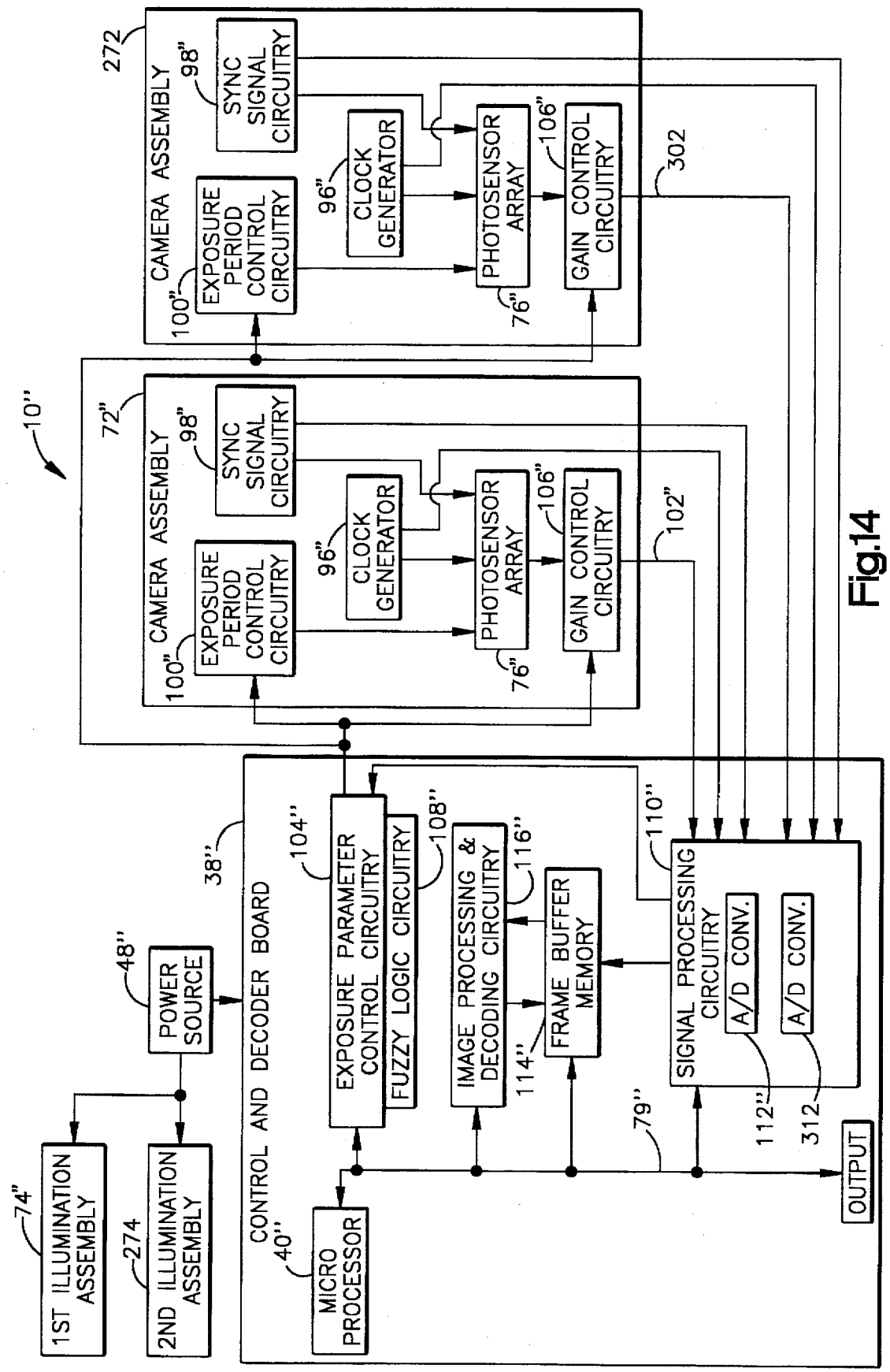
FIG. 14 is a block diagram of selected circuitry incorporated in the slot dataform reader apparatus of FIG. 13.

The first camera module 32" and the second camera module 232 each function similarly as the camera module 32 for the slot dataform reader apparatus 10 of FIG. 1. As illustrated in FIG. 14, the first and second camera assemblies 72" and 272 for the first and second camera modules 32" and 232, respectively, output the first composite video signal 102 and the second composite video signal 302, respectively, to the signal processing circuitry 110" on the control and decoder board 38" of the apparatus 10". Similarly as for the slot dataform reader apparatus 10 of FIG. 1, the exposure parameter control circuitry 104" and the fuzzy logic circuitry 108" operate in conjunction with the exposure period control circuitry 100" and the gain control circuitry 106" for each camera module 32" and 232 to control exposure periods and amplification of the composite video signals 102 and 302.

Operating under the control of the microprocessor 40", the signal processing circuitry 110" digitizes the first analog video signal 102 with the A/D converter 112" and converts the digitized video signal to a sequence of gray scale values representative of the frame image captured by the first camera module 32". The signal processing circuitry 110" also digitizes the second analog video signal 302 with the A/D converter 312 and converts the digitized video signal to a sequence of gray scale values representative of the frame image captured by the second camera module 232. The signal processing circuitry 110 stores the set of gray scale values for both frame images in the frame buffer memory 114". The image processing and decoding circuitry 116" analyzes each image frame separately to determine whether a decodeable dataform image is represented in either captured image frame in the frame buffer memory 114" and to decode the dataform.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A fixed position dataform reader for reading a dataform printed on a substrate and passed through a two-dimensional target area, the reader comprising:

a) a housing having a base surface, a face surface and at least one side surface, interconnecting the base surface to the face surface, defining an interior region, the face surface defining an aperture;

b) a first camera assembly including a two-dimensional photosensor array supported in the interior region and an optics assembly spaced from the two-dimensional photosensor array to focus an image of the two-dimensional target area including the dataform onto the two-dimensional photosensor array, the photosensor array comprising a two-dimensional array of photosensors which are read out after an exposure period to generate a signal representative of an image of the two-dimensional target area including the dataform;

c) an analog to digital converter electrically coupled to the first camera assembly receiving the signal and converting the signal to a plurality of gray scale digital values representative of the image of the two-dimensional target area including the dataform;

d) a memory electrically coupled to the analog to digital converter for storing the plurality of gray scale digital data values;

e) image processing and decoder circuitry coupled to the camera assembly and the memory for determining a set of digital data values from the plurality of gray scale digital values which correspond to an image of the dataform and decoding the set of digital data values to generate decoded data representative of the dataform; and f) a mounting support, secured to the housing, for mounting the reader in a fixed position with respect to the two-dimensional target area.

2. The fixed position dataform reader of claim 1, comprising a radio transmitter coupled to the signal processing and decoder circuitry for transmitting the decoded data to a remote host.

3. A fixed position dataform reader for reading a dataform printed on a substrate and passed through a selected one of a first portion of a target area and a second port of the target area, the reader comprising:

a) a housing having a base surface, a face surface and at least one side surface, interconnecting the base surface to the face surface, defining an interior region, the face surface defining an aperture;

b) a first camera assembly including a two-dimensional photosensor array supported in the interior region and an optics assembly spaced from the two-dimensional photosensor array to focus an image of a dataform passed through the first portion of the target area onto the two-dimensional photosensor array;

c) image processing and decoder circuitry coupled to the camera assembly for generating decoded data representative of the dataform;

d) a mounting support, secured to the housing, for mounting the reader in a fixed position with respect to the desired target area; and e) a second camera assembly including a second two-dimensional photosensor array supported in the housing interior region and a second optics assembly spaced from the second photosensor array to focus an image of a dataform passed through the second portion of the target area onto the second photosensor array.

4. The fixed position dataform reader of claim 1, comprising a first reflective surface positioned in the interior region to redirect at least a portion of a field of view of the camera assembly into at least a portion of the two-dimensional target area.

5. A fixed position dataform reader for reading a dataform printed on a substrate and passed through a desired target area, the reader comprising:

a) a housing having a base surface, a face surface and at least one side surface, interconnecting the base surface to the face surface, defining an interior region, the face surface defining an aperture;

b) a first camera assembly including a two-dimensional photosensor array supported in the interior region and an optics assembly spaced from the two-dimensional photosensor array to focus an image of the dataform onto the two-dimensional photosensor array;

c) image processing and decoder circuitry coupled to the camera assembly for generating decoded data representative of the dataform; and d) a mounting support, secured to the housing, for mounting the reader in a fixed position with respect to the desired target area; and e) a first reflective surface positioned in the housing interior region to redirect at least a portion of a field of view of the camera assembly into at least a portion of the target area and a second reflective surface positioned in the housing interior region to redirect a second portion of the field of view into another portion of the target area.

6. The fixed position dataform reader of claim 4, wherein the first reflective surface is a mirrored surface.

7. The fixed position dataform reader of claim 5, wherein the first and second reflective surfaces are mirrored surfaces.

8. A method of completing a sales transaction for the sale of a plurality of items, each item including a dataform including encoded data identifying the item, the method comprising:

a) mounting at a fixed position a dataform reader including a camera assembly, a two-dimensional photosensor array comprising a two-dimensional array of photosensors, and an optic assembly for focusing an image of a two-dimensional target area onto the photosensor array;

b) passing a dataform of an item through the two-dimensional target area to focus an image of the two-dimensional target area including the dataform onto the two-dimensional photosensor array;

c) reading out the array of photosensors of the two-dimensional photosensor array after an exposure period to generate a signal representative of an image of the two-dimensional target area including the dataform;

d) converting the signal to a plurality of digital image data values representative of the image of the two-dimensional target area including the dataform;

e) storing the digital image data values in a memory;

f) processing the digital image data values stored in memory to determine a set of digital image data values corresponding to an image of the dataform;

g) decoding the set of digital image data values to generate decoded data identifying the item;

h) retrieving a price for the item corresponding to the decoded data identifying the item; and i) repeating the steps (b) through (h) for each item.

9. The method of claim 8, wherein step (h) includes a substep of transmitting a representation of the decoded data by radio to a host terminal.

10. The method of claim 8 wherein the dataform in a two-dimensional dataform.

11. The fixed position dataform reader of claim 1 wherein the dataform is a two-dimensional dataform.

12. The fixed position dataform reader of claim 3 wherein the dataform is a two-dimensional dataform.

13. The fixed position dataform reader of claim 5 wherein the dataform is a two-dimensional dataform.

* * * * *